April 8, 1969
L. R. TURNER
3,436,770
INFANT'S CAR BED
Filed July 3, 1967
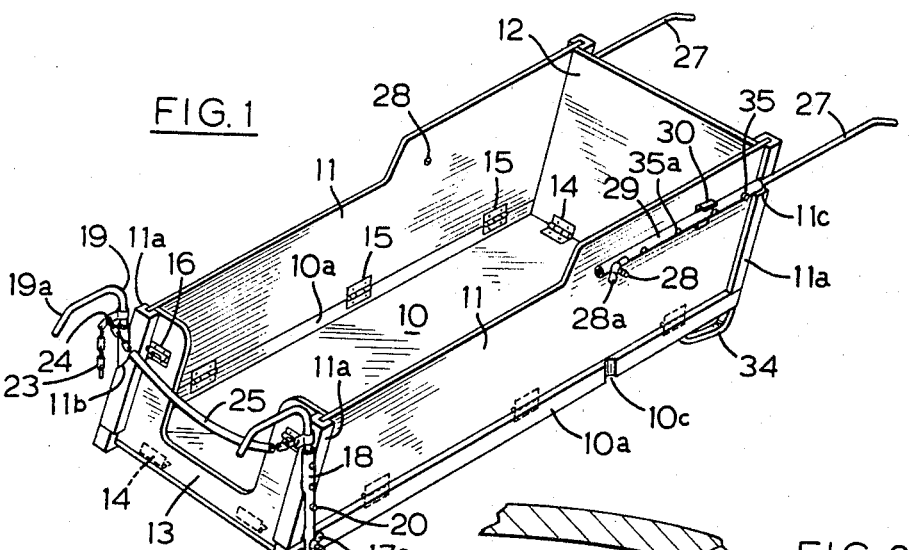
INVENTOR.
LEO R. TURNER
BY Maybee & Legris
ATTORNEYS United States Patent Office 3,436,770
Patented Apr. 8, 1969

3,436,770
INFANT'S CAR BED
Leo Robert Turner, 1280 Elgin Crescent,
Oakville, Ontario, Canada
Filed July 3, 1967, Ser. No. 650,702
Int. Cl. A47d 7/04; A47c 17/18
U.S. Cl. 5—94                           4 Claims

ABSTRACT OF THE DISCLOSURE

An infant's car bed having a rigid base supported horizontally over the rear seat of a car by forwardly and rearwardly extending members that rest, respectively, on the back of the front and rear seats of the car, and alternatively supported horizontally on the front seat of the car by sliding the rearwardly extending members forwardly along the sides of the bed and by swinging the forwardly extending members downwardly to form legs that can straddle the drive shaft hump of the car floor, the bed being collapsible for storage.

---

This invention relates to an infant's car bed, and more particularly to a bed that can be readily set up for use in the rear or the front of a car.

A bed constructed in accordance with the invention is provided with a preferably rigid base and suspending means that can extend over the backs of the front and rear seats of a car to support the bed over the rear seat, the bed having front supporting means (of which the front suspending means may be a part) that can rest on the floor of the car to aid in supporting the bed on the front seat. The bed preferably is a rigid box-like structure which does not slump in the car, but can be collapsed for storage. A preferred embodiment of the invention is illustarted in the accompanying drawings in which:

FIGURE 1 is an isometric view of a car bed set up to be suspended over the rear seat of a car;

FIGURE 2 is a diagrammatic longitudinal sectional view of a car showing the bed of FIGURE 1 suspended over the rear seat of the car and also showing the same bed rearranged to rest on the front seat of the car;

FIGURE 3 is a front view of part of the bed set up as shown in FIGURE 1;

FIGURE 4 is a side view of the front part of the bed shown in FIGURE 3; and

FIGURE 5 is a fragmentary view taken along the line 5—5 of FIGURE 2.

The car bed illustrated is a rigid box-like structure having a rigid wooden horizontal base 10 on which an infant can be supported, a pair of rigid wooden side walls 11 along opposite sides of the base, a rigid wooden end wall 12 along the rear end of the base, and a rigid wooden end wall 13 along the front end. Hinges 14 connect the ned walls to the base, and along its sides the base has side strips 10a to which are fastened hinges 15 connecting the side walls 11 to the base. The end walls can be swung inwardly on the hinges 14 to lie flat against the base 10, and the side walls can swing inwardly on the hinges 15 from the position shown in FIGURE 1, but not outwardly from that position. The axes of the side wall hinges 15 are elevated with respect to the axis of the end wall hinges 14 so that the side walls 11 can lie flat against the inwardly swung end walls for storage of the bed. The side walls 11 are reinforced by end moldings 11a, and latches 16 on the end walls have slidable bolts releasably engageable in apertures in these moldings 11a to secure the end walls to the side walls and prevent the side walls from swinging inwardly whereby the side walls can be held spaced apart and in substantially vertical planes as illustrated in the drawings.

At the front end of each strip 10a is a pivot pin 17 on which is journalled a tubular metal sleeve 18. Within the sleeve 18 is one end of a rigid tubular metal rod 19. Protruding from the rod 19 is a spring-pressed button 20 which can engage in one of several holes 20a along the length of the sleeve 18 to determine the longitudinal position of the rod in the sleeve. In the position illustrated in FIGURES 1, 3 and 4 the sleeves 18 are nested in vertical grooves 10b of the strips 10a and in grooves 11b of the moldings 11a, being held therein by wing nuts 17a tightened on the pivot pins 17. If the wing nuts 17a are loosened the sleeves 18 can be released from the grooves 10b, 11b and swung on the pins 17 invertical planes parallel to the side walls of the position illustrated in FIGURE 5 where, when the wing nuts 17a are again tightened, the sleeves are once again fixed in vertical positions, nested in the grooves 10b. The free end portions of the rods 19 are hook-shaped, and the longitudinal positions of the rods are adjusted, by locating the buttons 20 in suitable holes 20a, so that with the base 10 resting horizontally on the front seat 21 of a car the rods 19 extend below the base a distance substantially equal to the height of the seat 21 above the floor 22 of the car, whereby the hooked portions 19a of the rods can rest on the floor to support the front end of the bed. As shown in FIGURE 5 the rods are spaced apart laterally a sufficient distance to straddle the drive shaft hump 22a of the car floor, and lateral stability is added by a chain 23 engaged in slots of brackets 24 on the rods, the chain having a flexible sheath 25. Some or all of the weight of the bed can be carried by the chain 23 which bears, through the sheath 25, on the hump of the floor.

In order to support the bed over the rear seat 37 of the car, the wing nuts 17 are loosened whereby sleeves 18 are released and can be swung to the position shown in FIGURES 1, 3 and 4 where the rods 19 extend upwardly with respect to the base 10 and the hooked portions 19a extend forwardly to hook over the back 21a of the car's front seat. In addition to the front end supporting means, consisting of the rods 19 and chain 23, rear end supporting rods 27 are provided to assist in supporting the bed over the rear seat of the car. The rear rods 27 are connected to the side walls 11 by means of pivot pins 28, wing nuts 28a and sleeves 29 corresponding to the releasable and pivotal connecting means 17, 17a and 18 for the front rods 19. In the position shown in FIGURE 1 the sleeves 29 extend horizontally rearwardly from the pivot pins 28 and are nested in grooves 11c of the rear moldings 11a, being fixed in this position by the wing nuts 28a and by stops 30. The sleeves 29 serve as tubular guides for the rigid rods 27 which are slidable in the sleeves substantially parallel to the base. Thus the rods 27 can be removed from the protruding position shown in FIGURE 1 by sliding them to the retracted position shown at the right hand side of FIGURE 2 when the bed is resting on the front seat of the car. In the protruding position the rods protrude from the rear end of the box-like bed to extend over and rest upon the back 37a of the rear seat of the car. Thus the free ends of the rods 27 serve as suspending means, as do the hooked end portions 19a of the rods 19, to support the bed over the rear seat 37 of the car. The rods 27 are spaced upwardly from the base 10 at substantially the elevation of the hooked portions 19a so that the base 10 is substantially horizontal. The base may be provided with a hook 32 engageable by a seat belt 33 of the car to ensure that the bed does not bounce. The base may also have a pair of corner pieces 34 providing fillers that approximate the contour of the front car seat.

The wing nuts 28a can be released to enable the sleeves 29 and rods 27 to be swung down about the pins 28 to a vertical position in which the sleeves are nested in grooves 10c in the strips 10a. The rods 29 can then serve, together with the rods 19 in their lower position, as legs for the car bed, which can then be used outside the car as a bassinette. The longitudinal positions of the tubular rods 27 in the sleeves 29 can be fixed by means of spring-pressed buttons 35 registrable in holes 35a in the sleeves 29.

Not illustrated are the usual mattress, bumper and safety strap to restrain the occupant of the car bed, but these may be provided. With the bottom, sides and ends of the bed made of rigid material the bed is self-supporting as contrasted with beds constructed of flexible plastic or canvas suspended from a collapsible metal framework. The rigid, self-supporting structure provides a safe enclosure when located on the front seat or when suspended over the rear seat. The end walls are inclined at roughly the angles of the seat backs to make the most use of the available space.

Although for compactness it is preferred to provide front supporting rods 19 that can be pivoted from a first fixed position such as that shown at the right hand side of FIGURE 2 to a second position such as that shown at the left hand side, it would be possible to fix the rods and sleeves in the latter position and provide them with downward extensions serving as legs when the bed is moved to the front seat, the hook portions 19a then being, if necessary, swung about a vertical axis clear of the dashboard 36 of the car.

What I claim as my invention is:

1. An infant's car bed comprising
    (1) a rigid box-like structure having side walls and a base on which an infant can be supported,
    (2) front end supporting means for said structure,
    (3) front connecting means for connecting the front end supporting means to said structure in a first and a second position,
        (a) the front end supporting means in the first position extending downwardly in fixed relation to the base an amount sufficient to rest on the floor of a car with the base resting substantially horizontally on the front seat of the car, and
        (b) the front end supporting means in the second position extending upwardly with respect to the base and having a pair of laterally spaced apart hooked portions extending forwardly whereby they can hook over the back of the front seat,
    (4) rear end supporting means for said structure, and
    (5) rear connecting means for connecting the rear end supporting means to said structure
        (a) in substantially parallel relation to the base,
        (b) spaced upwardly from the base at substantially the elevation of said hooked portions when in said second position, and
        (c) protruding rearwardly from said structure to rest on the back of the rear seat of the car with said hooked portions hooked over the back of the front seat whereby said structure can be suspended over the rear seat with the base substantially horizontal,
        (d) the rear connecting means being releasable for removal of the rear end supporting means from said rearwardly protruding position when the front end supporting means is in the first position.

2. An infant's car bed comprising
    (1) a rigid box-like structure having
        (i) a rigid horizontal base on which an infant can be supported,
        (ii) a pair of rigid side walls along opposite sides of the base,
        (iii) rigid end wall along opposite ends of the base,
        (iv) hinge means connecting the side and end walls to the base whereby the side and end walls can be swung into substantially horizontal planes adjacent the base for storage of the structure, and
        (v) releasable means for securing the end walls to the side walls to hold the side walls in substantially vertical planes,
    (2) front end supporting means for said structure comprising a pair of rigid supporting rods each having a free hooked end portion,
    (3) front connecting means comprising
        (i) pivotal means mounting one of said hooked rods at each side of the front end of said structure whereby said rods can be swung in planes substantially parallel to the side walls from a first position where the rods extend downwardly below the base to a second position where the rods extend upwardly above the base, and
        (ii) releasable means for fixing said hooked rods against movement in relation to said structure at least when the rods are in their first position,
            (a) said hooked rods in their first position extending below the base a distance substantially equal to the height of the front seat of a car above the floor of the car whereby said hooked portions can rest on the floor with the base resting substantially horizontally on the front seat,
            (b) said hooked portions in said second position of said rods extending forwardly whereby they can hook over the back of the front seat,
    (4) rear end supporting means for said structure comprising a second pair of substantially horizontal rigid supporting rods spaced upwardly from the base at substantially the elevation of said hooked portions when in said second position, and
    (5) rear connecting means comprising tubular guide means fixed to each of said side walls adjacent the rear end of said structure, the second pair of rods being slidable longitudinally in said guides substantially parallel to the base from a first retracted position to a second position where the slidable rods protrude from the rear end of said structure to rest on the back of the rear seat of the car with said hooked portions hooked over the back of the front seat whereby said structure can be supported over the rear seat with the base substantially horizontal.

3. An infant's car bed comprising
    (1) a structure having side walls and a base on which an infant can be supported,
    (2) front end supporting means for said structure and including hook portions,
    (3) first connecting means for connecting the front end supporting means to said structure in a first position with the hook portions lower than the base and in a second position with the hook portions higher than the base,
        (a) the front end supporting means in the first position extending downwardly in fixed relation to the base an amount sufficient to rest on the floor of a car with the base resting substantially horizontally on the front seat of the car, and
        (b) the front end supporting means in the second position extending upwardly with respect to the base with the hook portions extending forwardly to hook over the back of the front seat,
    (4) rear end supporting means for said structure, and
    (5) rear connecting means for connecting the rear end supporting means to said structure, the rear end supporting means including suspending means for extending over and resting upon the back of the rear seat of the car with the hook portions of the front end supporting means hooked over the back of the front seat and the base substantially horizontal.

4. An infant's car bed as claimed in claim 3, wherein the rear end supporting means protrude rearwardly to rest upon the back of the rear seat of the car, and wherein the rear end supporting means are retractable to reduce their rearward protrusion when the base of said structure rests on the front seat of the car.

References Cited

UNITED STATES PATENTS 2,853,718   9/1958   Lim _____ 5—94
3,037,216   6/1962   Stringer _____ 5—118

CASMIR A. NUNBERG, *Primary Examiner.*

U.S. Cl. X.R.

5—118